United States Patent [19]

Launie

[11] Patent Number: 4,659,204
[45] Date of Patent: Apr. 21, 1987

[54] LATCHING MECHANISM FOR PHOTOGRAPHIC APPARATUS

[75] Inventor: Kenneth J. Launie, Cambridge, Mass.

[73] Assignee: Polaroid Corporation, Cambridge, Mass.

[21] Appl. No.: 813,421

[22] Filed: Dec. 26, 1985

[51] Int. Cl.⁴ .................. G03B 17/02; G03B 17/50
[52] U.S. Cl. .................................... 354/288; 354/86
[58] Field of Search .................... 354/202, 288, 83–86

[56]  References Cited
U.S. PATENT DOCUMENTS 3,979,763  9/1976  Mills ................................ 354/202 X
4,104,660  8/1978  Norris .............................. 354/86 X

*Primary Examiner*—Donald A. Griffin
*Attorney, Agent, or Firm*—Karl Hormann

[57] ABSTRACT

A novel latching mechanism for the film loading door of photographic apparatus linked to switch means for connecting a battery to a control circuit when the door is fully closed and for disconnecting the battery at all other times, arresting means being provided for preventing the link from closing the switch and for aligning one latch member on the camera with another latch member on the door.

7 Claims, 9 Drawing Figures

LATCHING MECHANISM FOR PHOTOGRAPHIC APPARATUS

BACKGROUND OF THE INVENTION

1. Field of the Invention

The invention relates to photographic apparatus in general and, more particularly, to a novel latching mechanism for releasably securing a film loading door of such apparatus.

2. Description of the Prior Art

Photographic apparatus using film cassettes within which is stacked a plurality of film units are well known. The film unit on top of the stack is urged into a position abutting an exposure opening in the cassette, by a spring acting between the film unit at the bottom of the stack and underlaying cassette structure. Initially, the exposure opening is closed by a so-called dark slide to prevent unintended exposure of the film before the cassette is secured within a receiving chamber of the apparatus. As an added element, the cassette houses a substantially flat electrical battery which serves to provide power to a plurality of electrical components of the photographic apparatus.

Photographic apparatus suited for sequentially exposing the film units within a cassette of the kind referred to may be similar to the apparatus described in U.S. Pat. Nos. 3,750,551, 3,760,701, and 3,774,516. Hence, the apparatus may be provided with a door movable between open and closed positions to render an exposure chamber within the apparatus accessible for insertion or removal of a film cassette. The door may be releasably retained by a latch mechanism and may be cooperating with an electrical switch for energizing an electrical control circuit of the apparatus by the battery located within the cassette, when the door is in its closed position. A connection between the battery and the control circuit is established by electrical contact members positioned in the exposure chamber at a location where they may engage electrodes of the battery through apertures appropriately positioned in the film cassette.

The film within the cassette is protected from unintended exposure to light by a dark slide covering the top film unit of the stack. Once the cassette has been inserted into the exposure chamber, the door has been secured and the cooperating switch has established an electrical connection between the battery and the control circuit, the latter may be activated automatically to remove the dark slide from the cassette and to eject it out of the photographic apparatus.

The operation of the apparatus has been described in U.S. Pat. No. 3,774,516 as comprising a pre-exposure phase, an exposure phase, and a post-exposure phase executed seriatim in an automatic manner. The pre-exposure phase may include an automatic focusing operation, for instance as described in U.S. Pat. No. 4,200,378. After the lens has been properly focused, the apparatus executes an exposure phase which in the example of U.S. Pat. No. 3,774,516 consists of shutter closure, movement of a reflex member from a viewing position to an exposure position, shutter opening and closing to expose the film possibly accompanied by the firing of a flash, subsequent return of the reflex member to its viewing position in which, incidentally, it seals the film in the cassette from light, and opening of the shutter. The post-exposure phase causes removal of the exposed film unit from the cassette to the outside of the camera, through power-driven rollers. Movement of the film unit through the rollers may entail processing of the film unit by rupture of a pod of processing composition integral with the film unit and the spreading of the composition over the entire light-sensitive surface of the film unit as a coating of uniform thickness, to initiate a diffusion transfer process in a manner well known in the art.

Removal of the dark slide from the cassette to the outside of the apparatus is accomplished by bypassing the pre-exposure and exposure phases of the operation of the apparatus and by resorting, instead, to what essentially amounts to the post-exposure phase only, i.e., the dark slide is ejected in the same manner as an exposed film unit.

This is made possible by a control switch which reacts to removal of a film cassette from the apparatus by assuming a condition by which the control circuit suppresses the pre-exposure phase and the exposure phase of operation. The control switch advantageously cooperates with a film indexing or counting device which is reset in response to insertion of a cassette into the apparatus. Insertion into the apparatus of a fresh film cassette and actuation of the switch energizing the control circuit by closure of the film loading door thus causes ejection of the dark slide followed by resetting the control switch to a state in which pre-exposure and exposure phases are again made part of the operational cycle of the apparatus at least as long as there are film units in the cassette as determined, for instance, by the film indexing mechanism or counter provided in the apparatus. While ejection of the dark slide occurs automatically in response to closure of the film loading door, pre-exposure and exposure operational phases require operator assistance. For a more detailed discussion of this operation, reference may be had to U.S. Pat. No. 3,750,551.

The door latch of the prior art has been found to function satisfactorily in most instances. However, it comprises comparatively many parts, and relatively complicated linkages for actuation of the switch responsive to movement of the door.

SUMMARY OF THE INVENTION

It is, therefore, an object of the present invention to provide a simplified latch for a film loading door of a photographic apparatus.

Another object of the invention is to provide a door latch with a simple mechanism for opening or closing a power switch in response to movement of the latch for deenergizing or energizing a control circuit of a photographic apparatus.

A further object of the invention resides in the provision of a door latch which maintains the power switch in a condition in which energization of the control circuit is interrupted during the time the film loading door is in its open position.

Yet another object of the invention is to provide for a door latch movable between first and second positions for securing and releasing the film loading door and arrestable when in its second position.

These and other objects of the invention, in a preferred embodiment thereof, are accomplished by photographic apparatus comprising first and second housing sections connected to each other for movement between a first position in which an opening in one of said first and second housing sections is rendered accessible to permit insertion or removal of a film cassette and a second position in which the opening is closed, electrical control circuit means for controlling an operation of the photographic apparatus, latch means movable between a locking position in which the first and second housing sections are maintained in their second position, and a release position for releasing the first and second housing sections for movement into their first position, manually actuatable means for moving the latch means from its locking position to its release position, switch means connected to the electrical control circuit means and responsive to manual movement of the manually actuatable means for disconnecting the electrical control circuit means from a source of power when the latch means is in its release position, and means for releasably retaining the latch means in its release position.

Other objects of the invention will in part be obvious and will in part appear hereinafter.

The invention, accordingly, comprises the apparatus possessing the construction, combination of elements and arrangement of parts which are exemplified in the following disclosure and the scope of the application which will be indicated in the claims.

BRIEF DESCRIPTION OF THE DRAWINGS

For a fuller understanding of the nature and objects of the invention, reference should be made to the following detailed description taken in connection with the accompanying drawings wherein.

DESCRIPTION OF THE PREFERRED EMBODIMENT

Figure 1:
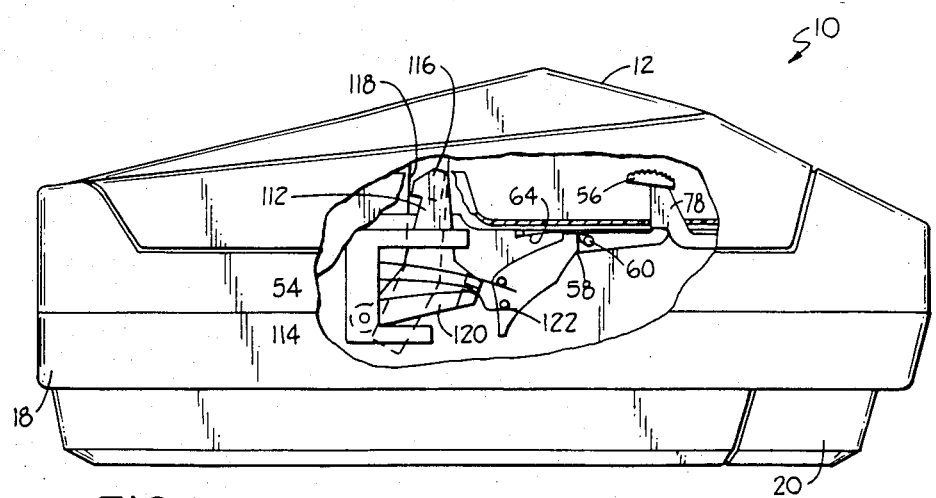
FIG. 1 is a side view, with parts broken away for clarity, of a photographic apparatus in accordance with the invention in a collapsed, inoperable condition.
Figure 2:
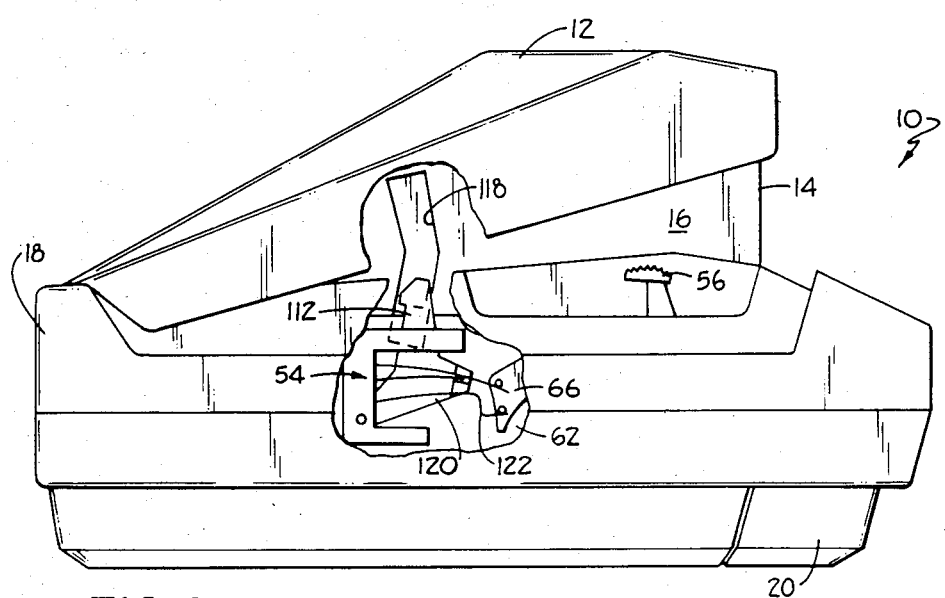
FIG. 2 is a view similar to FIG. 1 with the apparatus in its erected operable condition.
Figure 3:
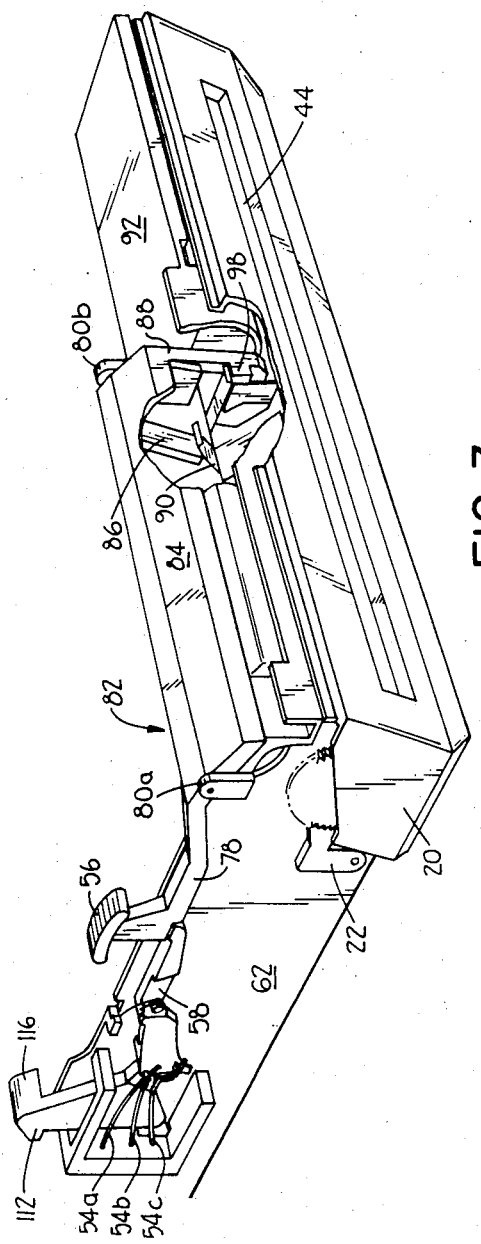
FIG. 3 is a perspective view of parts of the apparatus shown FIGS. 1 and 2.

The photographic apparatus shown in FIG. 1 represents a foldable photographic camera 10 in its collapsed storage, and, therefore, inoperable condition. FIG. 2 depicts the same camera 10 in its erected operable condition. These figures, as well as all other figures, are to be considered as schematic only, for they do not depict many of the well-known necessary components of cameras, such as objective lenses, shutter releases, exposure mechanisms, rangefinders, flash components, and the like.

The camera 10 comprises a first housing section 12, a forward wall 14 of which may serve as a support structure for the objective lens, exposure mechanism, rangefinder, and stroboscope (not shown). The camera 10 also comprises two side walls 16 (only one shown). The first housing section 12 is connected to a second housing section 18 by a hinge (not shown) for movement between its erected position (FIG. 2) and its collapsed position (FIG. 1). In the latter position the forward wall 14 and the side walls 16 are recessed within an appropriately configured well (not shown) in the second housing section 18. It will be appreciated by those skilled in the art that the first housing section 12, its forward wall 14 and its side walls 16, in their erected position, together with the second housing section 18 form an exposure chamber within which photographic film may be exposed.

Figure 7:
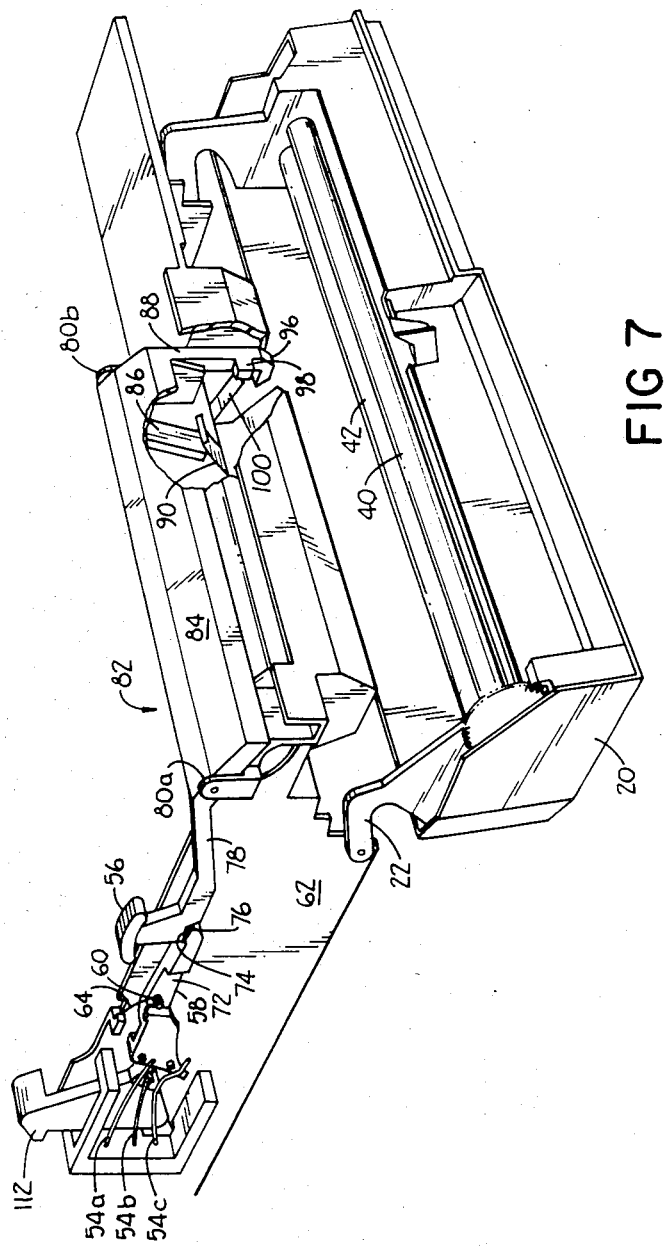
FIG. 7 is a perspective view of parts of the apparatus FIGS. 1 and 2, with the film loading door in its open position.
Figure 8:
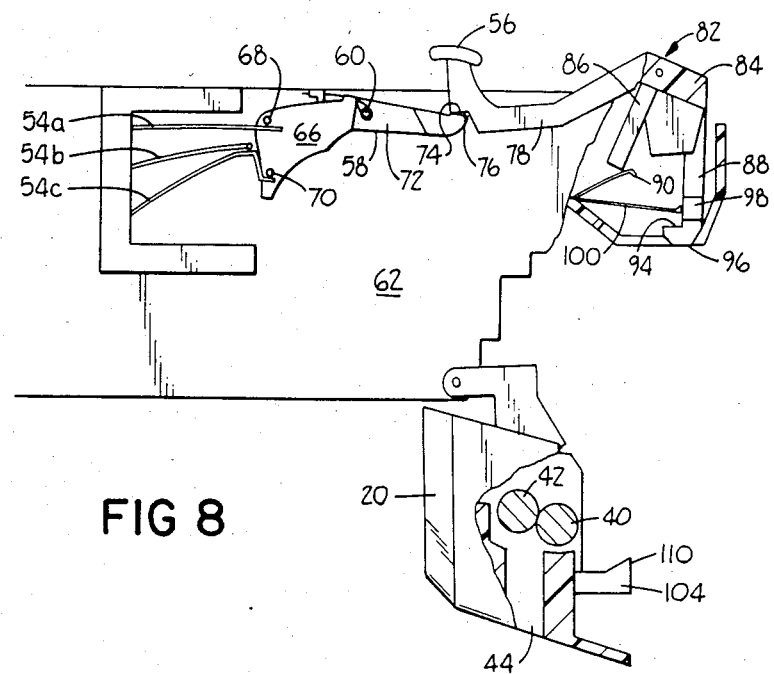
FIG. 8 is a section of the parts shown in FIG. 7 along line VII—VII.
Figure 9:
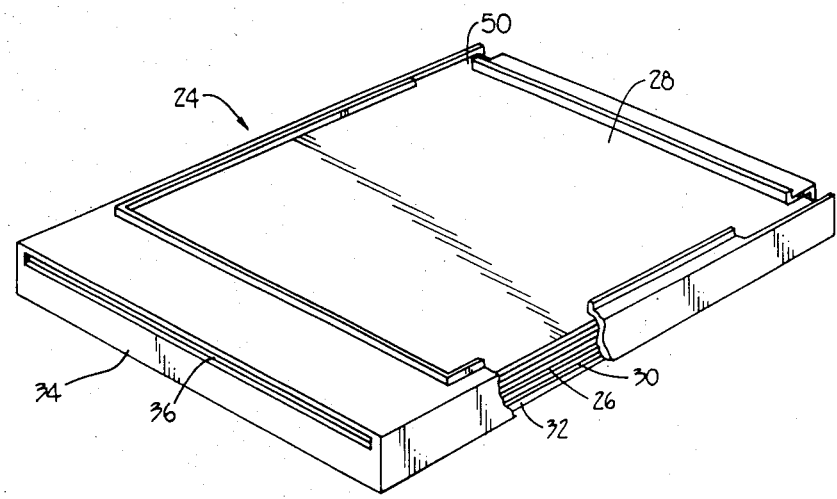
FIG. 9 is a perspective view of a loaded film cassette with parts broken away.

For loading such film into the exposure chamber the second housing section 18 is provided with a film loading door 20. The door 20 is mounted on the second housing section 18 by way of a hinge 22 for pivotal movement between a position in which it maintains an opening leading to the exposure chamber closed (FIGS. 1, 2, 3 and 4) and a position (FIGS. 7 and 8) which permits unimpeded access to the exposure chamber for purposes of inserting a cassette 24 (FIG. 9) of film into the exposure chamber or of removing it therefrom.

The film may be packaged within the cassette 24 as a stack of individual planar film units 26. The cassette 24 is provided with an opening 28 into which the film unit 26 at the top of the stack is urged by a spring loaded platen 30 acting against the lowest film unit 26 of the stack and supported by a bottom wall portion 32 of the cassette 24. When the cassette 24 is properly seated within the exposure chamber, the plane of the film unit 26 within the exposure opening 28 coincides with the exposure plane of the camera 10 in a manner well known in the art. In a forward wall 34 of the cassette there is provided a slot 36 through which the film units 24 may individually be moved to a gap 38 between a pair of processing rollers 40 and 42 and, thence, through a slot 44 in a forward face of the door 20, to the outside of the camera 10. The film units 26 are preferably of the self-processing kind provided at their forward end with a rupturable pod (not shown) of processing fluid and comprising two layers sealed along their margins to enclose, at least in an area coinciding with the opening 28 of the cassette 24, layers of photosensitive materials which after exposure to light and treatment with the processing fluid may yield an image of a subject in full color, as is well known in the art. Treatment of the photosensitive layers with the processing fluid is accomplished by rupture of the pod and subsequent spreading of the fluid between the layers of the film unit 26 over the photosensitive area, by pressure exerted by the processing rollers 40, 42. This, too, is an aspect well known in the art. Feeding of individual film units into the gap of the pressure rollers is carried out by a hook (not shown) engaging the rear margin of the film unit 26 uppermost in the stack, through a slot 50 formed in a rear wall, opposite slot 36, of the cassette. The hook is mounted for reciprocal movement along one side of the cassette 24 in a manner similar to that described in U.S. Pat. No. 3,760,701. The hook and the pressure rollers 40, 42 are driven by an electric motor (not shown) to which they are connected by a well-known motion transmitting mechanism, such as a gear train (not shown). The motor is at times energized by a control circuit connected to a battery. The battery may be provided as a separate component for insertion into the photographic apparatus, but preferably it is part of the film cassette 24. That is to say, whenever a new cassette 24 is loaded into the apparatus, a fresh battery is inserted as well, thus assuring a power supply at least adequate to accommodate as many operative cycles of the apparatus including, possibly, the firing of flash for each exposure and, of course, the ejection of the dark slide in preparation of the apparatus for film exposures, as there are film units in the cassette.

The battery is preferably stored within the cassette 24, between its bottom wall 32 and the film biasing spring of the platen 30, and is provided with the requisite electrodes for energizing the electrical components of the apparatus. The electrodes are accessible from outside of the cassette 24 by contacts (not shown) appropriately positioned within the cassette receiving section of the exposure chamber.

The electrical control circuit of the photographic apparatus of this invention is provided with a switching arrangement which prevents energizing any of the electrical operating components of the apparatus as long as the film loading door 20 is not in its fully closed and secured position (FIG. 2). This switching arrangement, generally indicated by reference character 54, is cooperatively connected to a button 56 provided adjacent a side wall 16, as well as other actuating components to be described. Connection between the button 56 and the switching arrangement 54 is established by a two armed lever or walking beam 58 which is rotatably mounted on a stud 60 protruding from a frame member 62 of the apparatus. The walking beam 58 is biased for rotation in a counterclockwise direction by a spring 64. The switching arrangement 54 comprises a plurality of contact blades 54a, 54b and 54c. One arm 66 of the walking beam 58, near its end opposite the pivot stud 60 is provided with two protruding pins 68 and 70 positioned over the contact blades 54a and 54c, respectively, in such a way that movement of the arm 66 in a manner to be described affects the position of the blades 54a and 54c relative to blade 54b. Another arm 72 of the walking beam 58 extending in a direction opposite arm 66 is provided with a camming surface 74 positioned to be engaged by a camming surface 76 of an arm 78 integral with the button 56.

Figure 4:
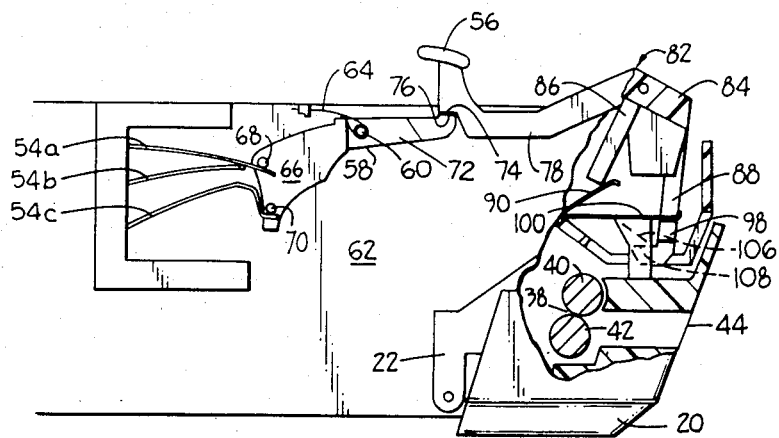
FIG. 4 is a section along line line III—III of FIG. 3.

The arm 78 is pivotally mounted between two brackets 80a and 80b which are integral with the frame 62 of the apparatus. The arm 78 is part of a bell crank 82 having a portion 84 extending normal to the arm 78 and parallel to a support member 92 to substantially halfway across the apparatus 10. For this reason, the bracket 80b is laterally displaced from the bracket 80a to a location near the longitudinal axis of the apparatus. Adjacent the bracket 80b the arm portion 84 is provided with two downwardly directed arms 86 and 88. The arm 86 is in constant engagement with an upwardly biased leaf spring 90 which is anchored by well-known means to the support member 92 which extends normal to and may, in fact, be integral with the frame 62 and parallel to the slot 44. The spring 90 biases the bell crank 82 in a clockwise direction (FIG. 4) to an extent determined by the position of the other arm 88. The free end of the arm 88 is shaped as a hook having an upwardly facing step-like shoulder 94 and a rounded outer contour 96. Furthermore, the arm 88 is provided with a laterally protruding abutment 98. The abutment 98 cooperates with a further leaf spring 100 which is also anchored on the support member 92. A free end of the spring 100 pointing to the right in FIG. 4 is bent normal to the plane of the spring to form an abutment surface 102. The spring 100 is biased in a downward direction so that its abutment surface 102 will at times be located in a plane common with the abutment 98 of the arm 88.

Positioned substantially in the same vertical plane as the arm 88 but affixed to an internal portion of the door 20 is an upright member 104 (FIGS. 5 and 6) having an inclined upper surface 106 inclined to the left of FIG. 4 and ending in a downwardly directed facing surface 108. The surface 106 is positioned such that it intersects the rounded contour surface 96 of the arm 88 when the door 20 is pivoted from an open position to a closed position, and the abutment surface 108 is located in substantially the same plane as, and is in engagement with, the step shoulder 94 of the arm 88 when the door 20 is fully secured and closed position as shown in FIG. 4. The upright member 104, adjacent its inclined surface 106 supports an upwardly directed protrusion 110 which is located in the same vertical plane as the spring 100, and serves to lift the spring 100 to a level above the abutment 98 when the door 20 is closed.

FIG. 4 shows the switching arrangement 54 in a condition in which the contact blade 54a is biased into engagement with the contact blade 54b by engagement with the pin 68 of the arm 66 of the walking beam 58. When in such engagement with each other, the contacts 54a and 54b connect the battery to the control circuit of the apparatus. In this position the walking beam 58 is rotated as far as is possible in a counterclockwise direction owing to the engagement of the camming surface 74 of its arm 72 with the camming surface 76 of the bell crank 78. The bell crank 78 is in this condition rotated as far in a clockwise direction as is possible owing to the engagement of the step shoulder 94 with the abutment surface 108 of the upright member 104. This is the state of arrangement in which the door 20 is fully closed and secured.

Figure 5:
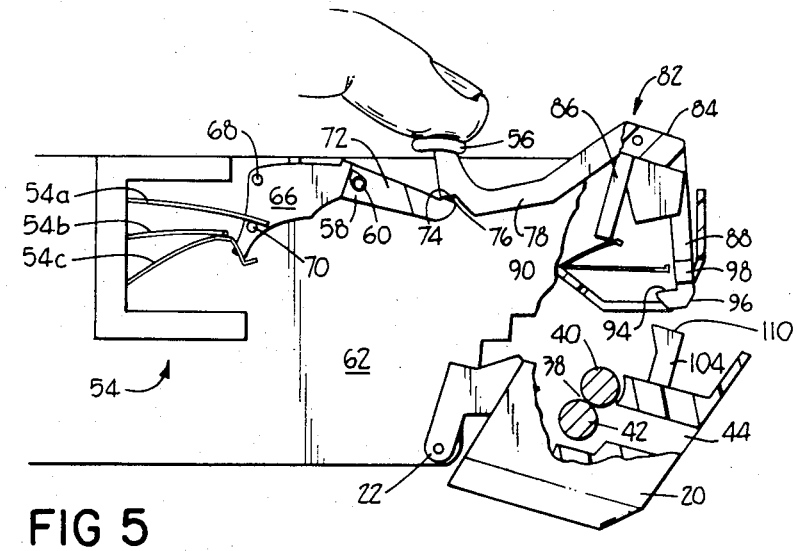
FIG. 5 is a view similar to FIG. 4 with the latching mechanism actuated beyond its release position.

As indicated in FIG. 5, the button 56 may be depressed by an operator. Thus, the bell crank 78 is pivoted in a counterclockwise direction, and the step shoulder 94 of its arm 88 is disengaged from the abutment surface 108 so that the door 20 may be moved to its open position. At the same time, as the protrusion 110 no longer engages it, the leaf spring 100 is deflected downwardly under its own bias and into the plane of the abutment 98. Depression of the button 56 also results in clockwise pivoting of the walking beam 58, i.e., its arm 66 moves upwardly. This, in turn, leads to the pin 68 being lifted off the contact blade 54a and to the pin 70 being lifted off the contact blade 54c. As both blades 54a and 54c are resiliently biased upwardly, the blade 54a lifts off the blade 54b and the blade 54c moves into engagement with the blade 54b. Thus, the control circuit of the apparatus is disconnected from the battery. Contact between the blades 54b and 54c establishes a circuit to a resistive sink into which all capacitors of the control circuit are drained for purposes not relevant in the present context.

Figure 6:
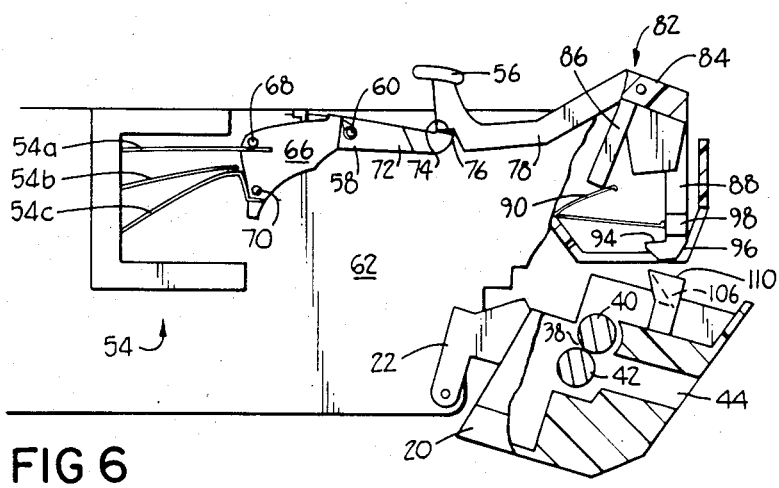
FIG. 6 is a view similar to FIG. 4 with the latching mechanism in its release position.

Release of the button 56 by the operator causes a slight clockwise rotation of the bell crank 78 under the bias exerted by the spring 90 against the arm 86, until the abutment 98 of the arm 88 moves into contact with the tip 102 of the spring 100. No further movement of the bell crank 78 is possible as the spring 100 by engaging the abutment 98, effectively functions as an arresting mechanism. It also functions to align the rounded contour 96 of the arm 88 with the inclined surface 106. The clockwise rotation of the bell crank 78 is too small for the walking beam 58 and the pins 68 and 70 to reverse the present status of the switch arrangement 54 (FIG. 6).

The door 20 of the apparatus 10 having thus been released, it may be pivoted downwardly to open the film receiving chamber of the apparatus and an empty cassette 24 within the chamber may be exchanged for a loaded one. Once the exchange has taken place, the door 20 may be closed and secured simply by pivoting it into its closed position (FIG. 4). During this pivoting the inclined surface 106 of the upright member 104 engages the rounded contour tip 96 of the arm 88 and causes the arm 88 to pivot in a counterclockwise direction until the shoulder 94 reaches alignment with the abutment 108. At this point the protrusion 110 will have lifted the spring 100 to a level above the abutment 98 so that the arm 88 under the bias of the spring 90 acting against the arm 86 may snap into the position in which the shoulder 94 and the abutment surface 108 are again in contact with each other to secure the door 20.

Snapping of the arm 88 into this position rotates the bell crank 78 sufficiently for the walking beam 58 to move the contact blades 54a and 54c into and out of engagement with the contact blade 54, respectively, by the pins 68 and 70.

As shown in FIG. 1, there is provided a recess in the first housing section 12 in which the button 56 is seated when the apparatus 10 is in its collapsed position. The button 56 is, therefore, rendered inaccessible when the apparatus is folded down.

However, in order to disconnect the battery 52 from the control circuit of the apparatus 10, when the apparatus is in its collapsed condition, means is provided which separates the contact blade 54a from the blade 54b and which, at the same time, establishes contact between blades 54b and 54c. This means is shown in FIG. 1 as a toggle lever 112 pivotally mounted on a stud 114 protruding from the frame 62, and having a beveled head portion 116. The head portion 116 is seen to extend upwardly into an area of the apparatus 10 which is occupied by the first housing section 12. The first housing section 12 is provided with a curved channel 118 which extends substantially vertically and which serves slidably to receive the head 116. The lever 112, intermediate its pivot 114 and its head 116, is provided with a lateral extension 120 within which there is formed a channel 122. The contact blade 54b is slidably received within the channel 122. Thus, when the apparatus 10 is erected, the lever 112 rotates in a counterclockwise direction owing to the camming action exerted on its head 116 by the channel 118. Accordingly, the contact blade 54b is moved upwardly into engagement with the contact blade 54a, by the extension 120. On the other hand, when the apparatus 10 is moved into its collapsed condition, the lever 112 toggles in a clockwise direction carrying with it the extension 120 and, hence, the contact blade 54b until the latter engages the lower contact blade 54c when the first housing section 12 is fully nested within the second housing section 18. As all the contact blades 54a-c are resilient, their movement relative to each other does not require extreme tolerances.

Since certain changes may be made in the above latching arrangement without departing from the scope of the invention herein involved, it is intended that all matter contained in the above description or shown in the accompanying drawings be interpreted as illustrative and not in their limiting sense.

What is claimed is:

1. Photographic apparatus comprising first and second housing sections connected to each other for movement between a first position in which an opening in one of said first and second housing sections is rendered accessible to permit insertion or removal of a film cassette and a second position in which said opening is closed;

electrical control circuit means for controlling an operation of the photographic apparatus;

latch means movable between a locking position in which said first and second housing sections are maintained in said second position, and a release position for releasing said first and second housing sections for movement into said first position;

manually actuatable means for moving said latch means from said locking position to said release position;

switch means connectable to said electrical control circuit means and responsive to manual movement of said manually actuatable means for disconnecting said electrical control circuit means from a source of power when said latch means is in said release position; and means for releasably retaining said latch means in said release position.

2. The apparatus of claim 1, wherein said latch means comprises means for releasing said latch means from its release position in response to movement of said first and second housing sections from their first position to their second position.

3. The apparatus of claim 2, wherein said latch means comprises first and second members mounted on said first and second housing sections, respectively, one of said first and second members being movable relative to the other member when said housing sections are in their second position.

4. The apparatus of claim 3, wherein means is provided for biasing said movable member into a locking position.

5. The apparatus of claim 2, wherein said retaining means is biased for movement into its retaining position in response to movement of said first and second housing sections to their first position.

6. The apparatus of claim 5, wherein said other member is provided with means for moving said retaining means out of its retaining position in response to movement of said first and second housing sections to their second position.

7. The apparatus of claim 6, wherein said first and second members are provided with cooperating camming surfaces and wherein said retaining means retains the camming surface of one of said first and second members in alignment relation to the other camming surface of the other member when said first and second housing sections are in their first position.

* * * * *